3,007,162
AIRPLANE INSTRUMENT APPROACH AND LANDING SYSTEM

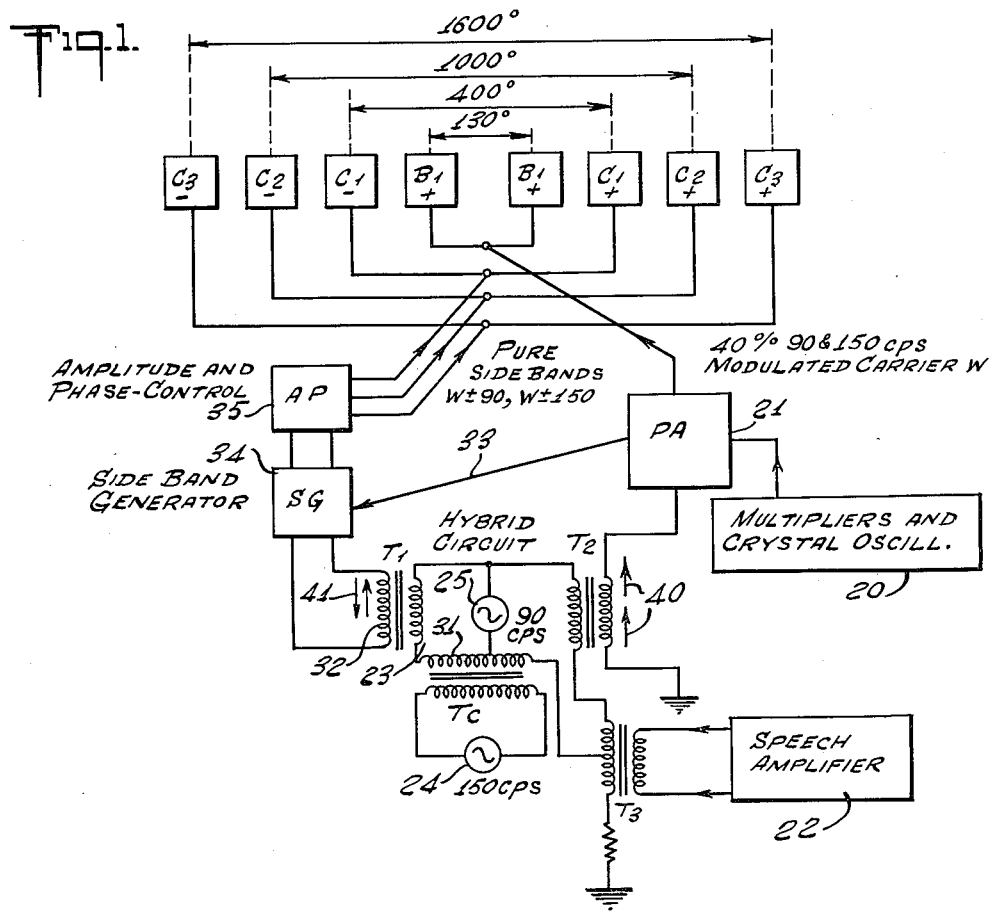
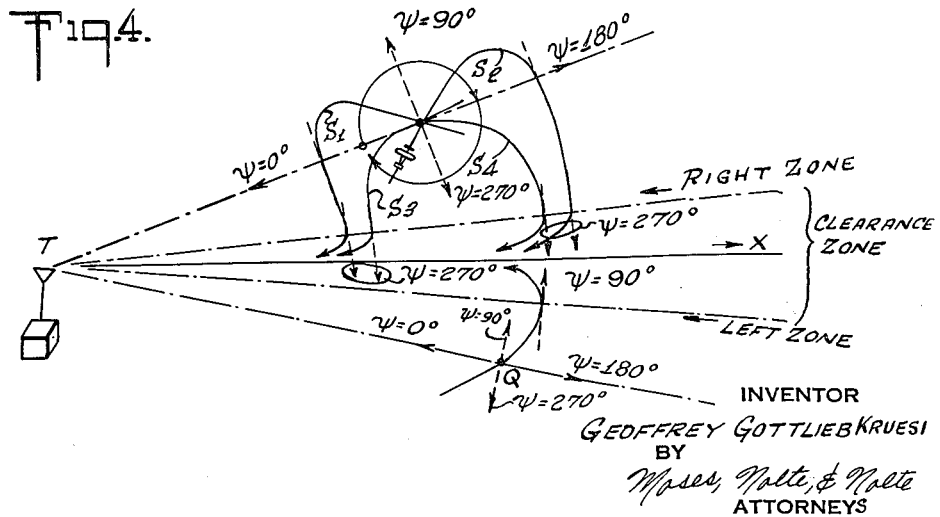

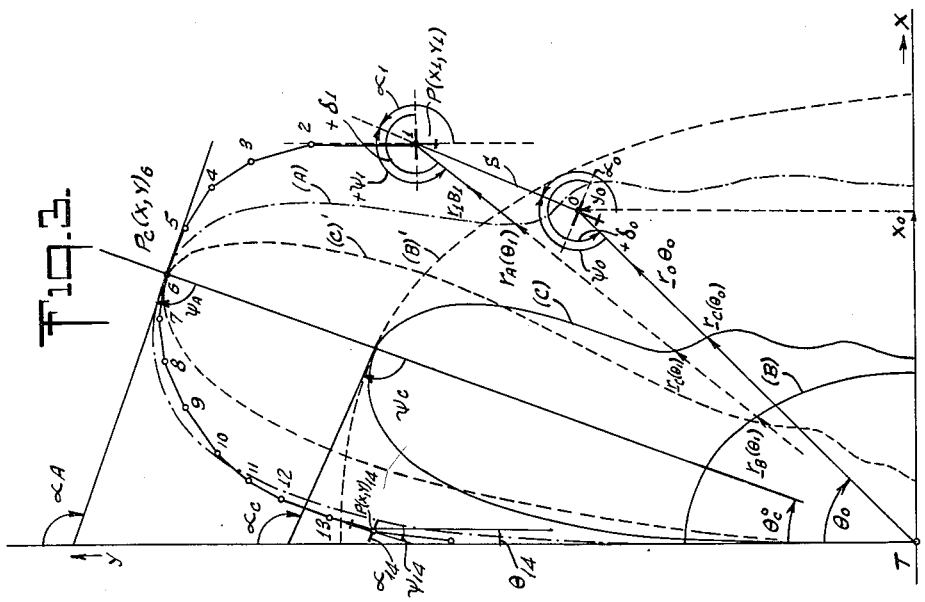
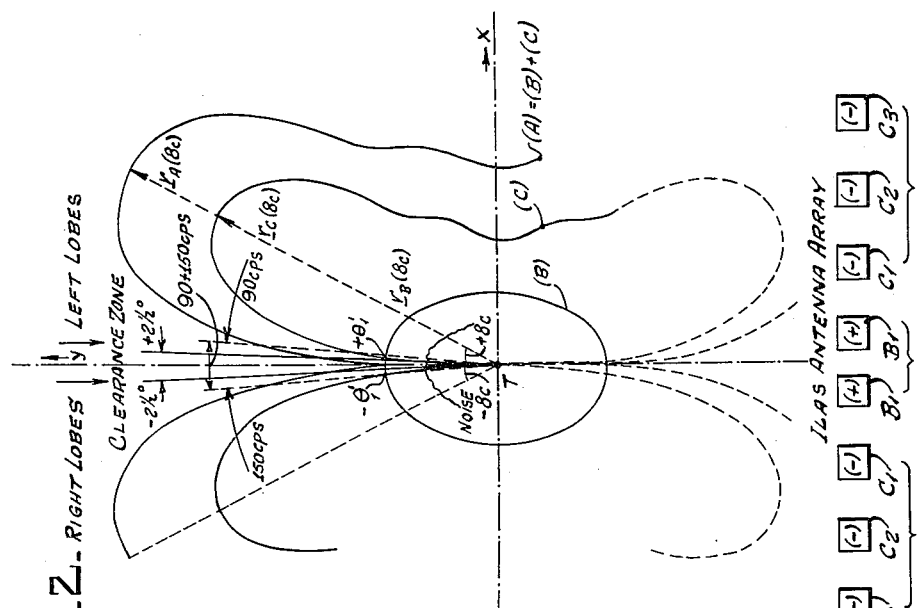

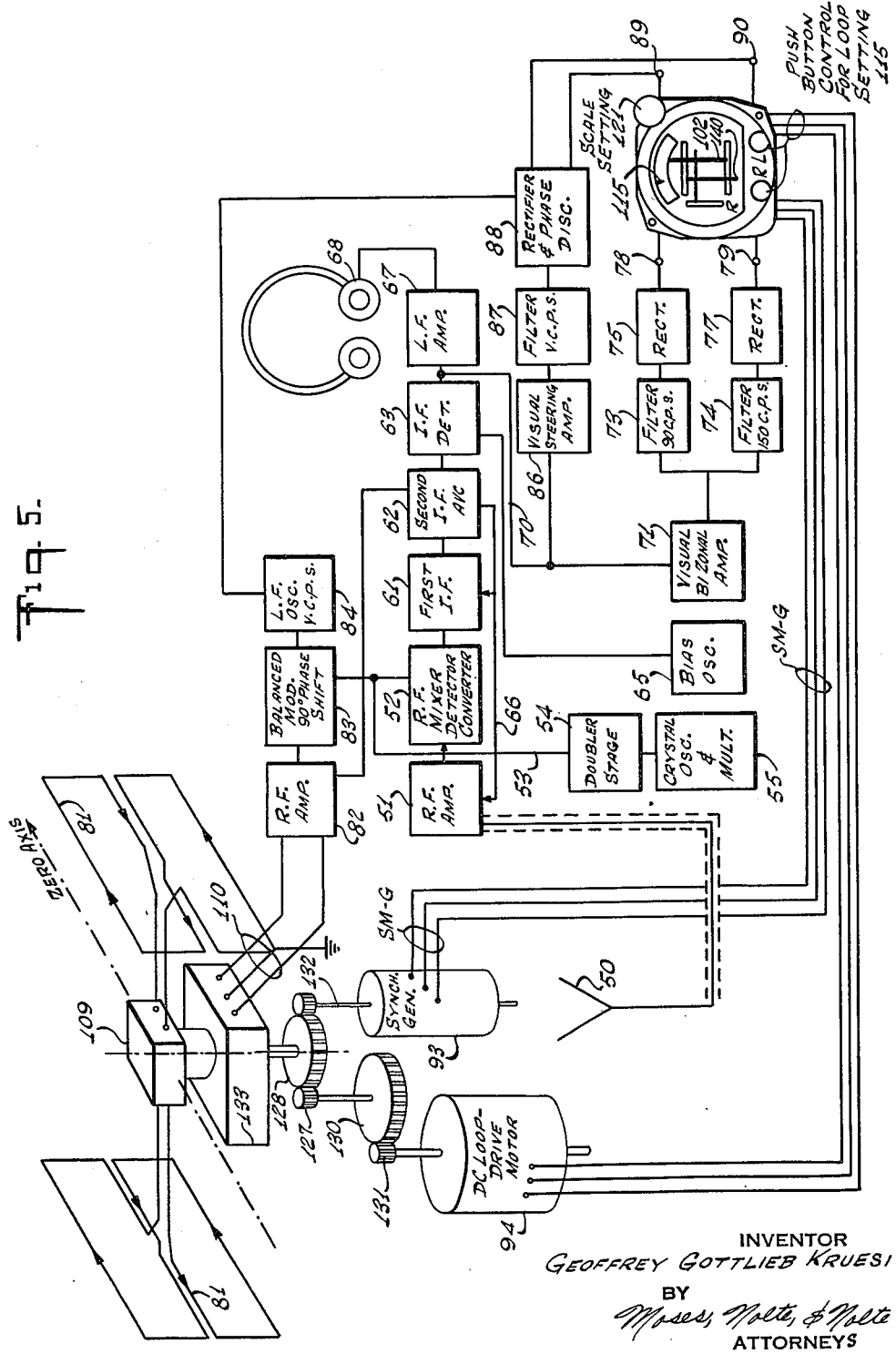

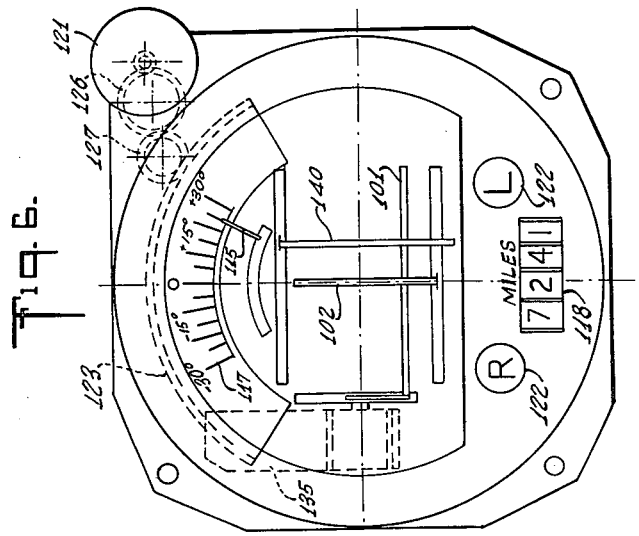

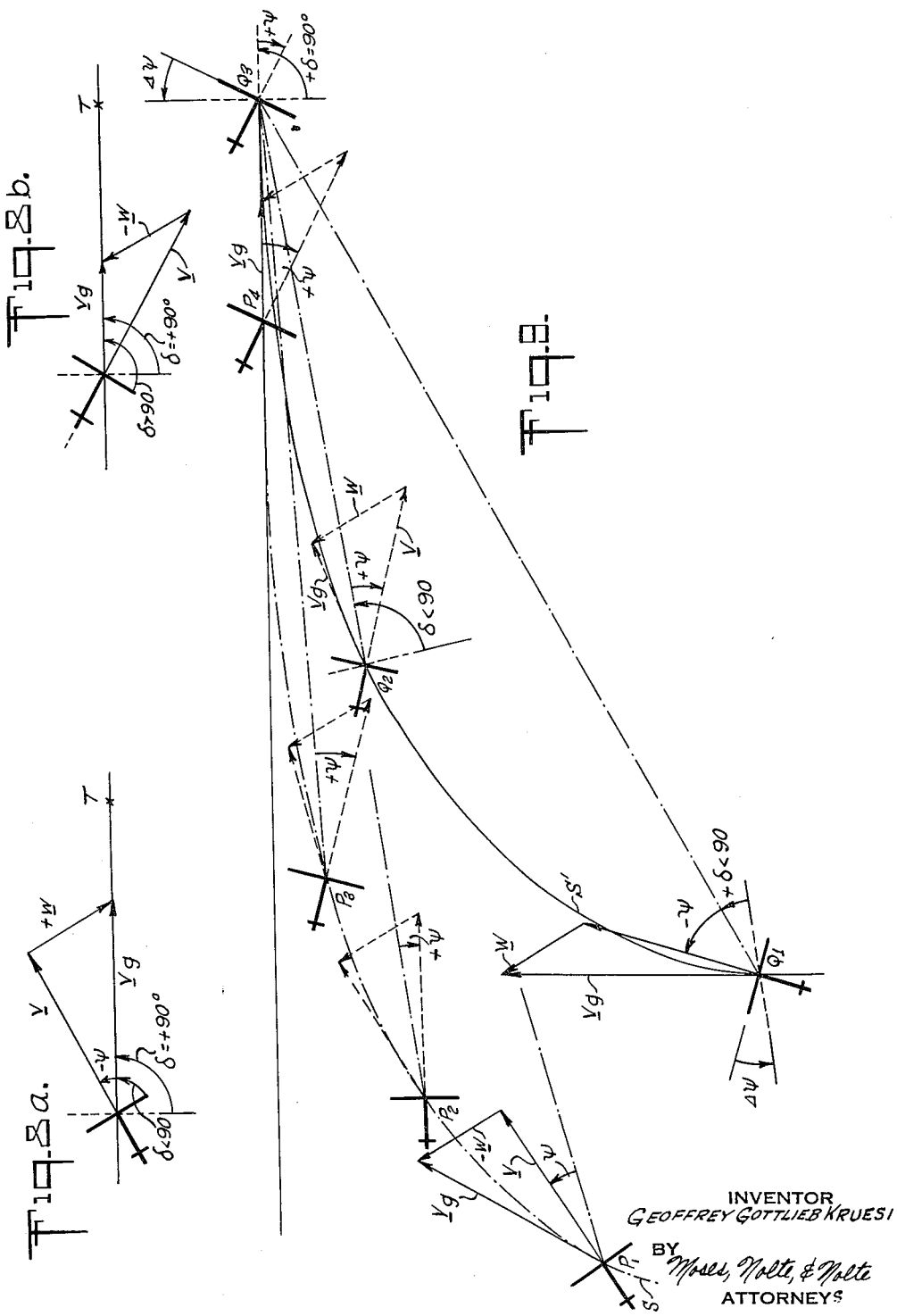

Geoffrey Gottlieb Kruesi, 850A Union St., San Francisco, Calif., assignor of ten percent to Albert C. Nolte, Sr., New York, N.Y.

Filed July 23, 1957, Ser. No. 673,671
2 Claims. (Cl. 343—107)

The present invention relates to instrument approach and/or landing systems of airplanes and particularly to systems which provide the airplane pilot or auto-pilot with a radio signal which is used to result in a zero control command information by which to continuously steer the aircraft, instant for instant from an arbitrary initial position and heading in space to a radio transmitter such as used in the known ILAS (instrument landing approach system), VOR (very high frequency omni-directional range), TACAN (tactical aircraft navigation system), or VORTAC (very high frequency omni-directional range and tactical aircraft communication system) systems in accordance with a given flight plan.

Thus, while the ILAS system gives the pilot an airborne bi-zonal displacement signal off a predetermined straight approach course leading to the radio range beacon transmitter, in the horizontal plane, the VOR system provides for any number of such displacement signals relative to straight ground tracks emanating radially from the VOR transmitter between 0° and 360° relative to the magnetic North direction. The TACAN and VORTAC systems, in addition to the omni-directional ground track displacement signals, furnish the pilot the actual distance of the aircraft from the radio transmitter on the ground automatically and continuously. The ILAS system, furthermore, gives the pilot a displacement signal relative to a straight glide path making a predetermined angle with the ground and indicating whether the aircraft's position is either too high or too low with respect to the glide path.

It is important to note that none of the above systems provide for a foolproof radio heading information, since the positional displacement signals indicated to the pilot, at an arbitrary position in space away from the ground track to be flown, would be the same no matter what the heading of the aircraft may be.

Instant maneuverability of the aircraft with respect to a given point on the ground during zero visibility conditions, particularly at low altitudes, is, of course, the object of all instrumentation on the aircraft. The positional displacement signal information provided by the above systems by itself is only useful in connection with the information derived from the directional gyro compass and either a magnetic or earth-inductor compass. However, the additional observation of two more instruments besides the one giving the positional displacement cannot even approach the instant maneuverability of the aircraft obtained if, as in the present invention, a foolproof radio heading signal obtained from one and the same ground transmitter of a TACAN or ILAS type system together with the positional displacement signal, is combined into one signal made visible by a single right-O-left zero center type meter. The maneuverability, in other words, becomes instantaneous according to the invention in extremely simple fashion because the radio heading information contained in the new signal indication is absolutely foolproof, direct and related specifically to the ground transmitter location.

A most important object of the invention is to provide a foolproof radio heading indication which may be perceived very easily within plus or minus ½ degree, when the positional displacement information is no longer available, i.e., when the aircraft is inside the electrical noise zone or clearance zone within about plus or minus 2½ degrees of the pre-selected ground track.

A general object of the invention is to provide an airplane pilot (or auto-pilot) with an airborne omni-directional and ground-supplied bi-zontal radio signal to thereby produce a resultant radio signal which may be used to render a zero control command information and determine for the pilot whether the aircraft's heading, instant by instant, is that unique one necessary to complete his flight plan. If it is, a zero command is presented to the pilot. Whenever the heading differs from the correct one, a heading command is signaled to the pilot (or auto-pilot) who responds with a control maneuver.

The control command signal actuates the needle of a zero center indicating type of microammeter by which the airplane pilot may ascertain if the aircraft is flying in accordance with a given flight plan and correct for deviational errors. By keeping the needle centered the course flown will be that resembling a spiral originating from an arbitrary position within the range of the ground transmitter and blending eventually, at a predetermined distance from the transmitter into the straight portion of the equi-signal zone of any of the above directional transmitting systems.

It is therefore an object of this invention to provide a simple assimilation, respectively, in the form of a single instrument indication of a foolproof radio steering signal meeting the essential requirements of accuracy of turn-indication together with a displacement signal derived from any of the ground supplied ILAS, VOR, TACAN or VORTAC track informations, as the case may be. Combining the two instrument indications into a single one permits not only simplicity in design and a considerable reduction in weight of the equipment, but provides for an augmented system reliability and additional safety due to simplified operation without the usual complex computer equipment.

It is another object of the invention to provide a system which supplements any kind of ground-supplied straight track information with an airborne radio heading information of adequate accuracy for instrument landing purposes, fed simultaneously into the azimuthal indicator movement by splitting one meter coil of the present cross-pointer indicator ILAS instrument into two sections connected, respectively, to the output terminals of a "visual bi-zonal position information channel" and to the output terminals of an airborne "visual radio steering channel." In another method which, in distinction to the above current feed method might be termed a voltage feed method, the two respective output terminal pairs are fed in parallel to the one standard moving coil over capacitors, respectively.

Other objects and advantages of the invention will become apparent and the invention will be fully understood from the following description and the drawing, in which:

FIG. 1 is a diagram of the transmitter circuit of the ILAS system;

FIG. 2 shows the radiation field patterns and the antenna array of the ILAS transmitter system;

FIG. 3 is a diagram of the automatically executed approach flight path to a given ILAS runway localizer course with no cross wind conditions;

FIG. 4 explains certain flight rules in connection with the observation of the automatic approach flight indicator while executing a curved flight path under zero-zero visibility conditions during the flight;

FIG. 5 is a schematic circuit diagram in block form of an ILAS runway localizer receiver with auxiliary directional antenna equipment, modified in accordance with this invention;

FIG. 6 and FIG. 7 are the elevational and side-elevational views of the new indicator used in the invention;

FIGS. 8a, 8b and FIG. 9 pertain to some of the theoretical aspects of the invention as related to its use under cross wind conditions.

Referring to the drawing, FIG. 1, the transmitter includes a stable high frequency source which may provide oscillations of a frequency of about 100 megacycles. The source 20 may include a crystal controlled oscillator operating at about 6 megacycles and suitable frequency multipliers for supplying the 110 megacycle oscillations to a power amplifier 21. The output of power amplifier 21 is modulated by voice frequencies and by 90 and 150 c.p.s. signals. The voice signals are fed into a speech amplifier 22. The speech amplifier is coupled by transformer $T_3$ to a hybrid circuit 23; one side of the hybrid circuit is coupled by transformer $T_2$ to the power amplifier. The 150 c.p.s. source 24 is coupled by the hybrid circuit differentially by transformer $T_c$.

The 90 c.p.s. source 25 is connected across the hybrid circuit from the center tap of the secondary winding 31 to the upper terminals of the primary coils of transformers $T_1$ and $T_2$. Transformers $T_1$ and $T_2$ are designed so as to present equal loads to the hybrid circuit. Secondary windings 32 of transformer $T_1$ is connected to a side-band frequency generator 34 which is supplied with H.F. power by a connection 33 from the power amplifier 21. The output of side-band generator 34 passes through an amplitude and phase control unit 35 to antennae $C_1$, $C_2$, $C_3$. Each of these antennae may consist of a pair of Alford loops. The spacings between the pairs of loops are 400°, 1000° and 1600°, respectively. The connections are such that the currents $+I_{1,2,3}$ flowing in one loop of a pair are of opposite H.F. phase of the currents flowing in the other loop of a pair, i.e., $-I_{1,2,3}$, in consideration. Antenna pairs, $C_1$, $C_2$, $C_3$ are fed, respectively, with pure side-band high frequency currents having angular frequencies of $(W \pm p)$ and $(W \pm q)$ radians/sec., in which $W = 2.\pi.f$ is the angular velocity of the carrier current, and $p = 2.\pi.90$, respectively, $$q = 2.\pi.150$$

are the angular velocities of the 90 c.p.s. and 150 c.p.s. modulations, are therefore devoid of currents of the carrier frequency F. The output of power amplifier 21, on the other hand, contains currents $+I_{B,1}$ and respectively $+_{B,1}$ feeding the center pair of antenna conductors $B_1$ by way of coupling, co-phaseally so, and being composed of a carried current component of angular velocity W, and side-band frequency current components with angular velocities, $(W \pm p)$, and $(W \pm q)$ radians per second. Speech modulation frequencies are included, and the percentage of modulation of the se currents which results from the combination of carrier and side-band frequency currents may be about 40%. The spacing of the antenna pair conductors of antenna pair $B_1$ is 130°. It can be seen that the 90 c.p.s. modulation currents will be fed to the two channels through the transformers $T_1$ and $T_2$ in phase, while the 150 c.p.s. modulation currents are fed, respectively, 180° out of phase. The transmitter shown in FIG. 1 is the same as that used in the ILAS system.

As is well known, the antenna array just described produces radiated field patterns such as are shown in FIG. 2 along the ground. Their function is to define, in combination, a ground supplied, straight, equi-signal zone or a straight fround flight track for the use and geographical orientation of the pilot along a predetermined ground line, respectively, during adverse weather conditions.

The method of creating the equi-signal zone consists in forming modulation products of a carrier transmission radiated by the center pair of antenna conductors $B_1$ which is equally modulated at 90 c.p.s. and 150 c.p.s., the frequency of the carrier current being $f$ c.p.s., and, the pure side-band frequency transmissions radiated by the antenna pairs $C_1$, $C_2$, $C_3$ having frequencies of $(f \pm 90)$ c.p.s. and $(f \pm 150)$ c.p.s. The field vector $r_B(\theta)$ and $r_C(\theta)$ pertain to the field amplitudes in polar coordinates, respectively, of the non-directional field pattern (B) produced by the antenna pair $B_1$ and of the directional field pattern (C) produced by the combination $C_{1+2+3}$ of the outer antenna pairs.

The modulation products thus formed render a resultant field amplitude pattern (A), the left and right side-lobes of which become the more prominantly modulated at, respectively, 90 c.p.s. and 150 c.p.s. as with increasing values $\theta$ of the angular positions, one of the two modulation frequencies disappears while, on the localized course, $T-y$, for which $\theta = 0$, both the 90 c.p.s. and 150 c.p.s. modulation envelopes are of equal amplitudes and phase, the value $r_A(\theta)$ reducing to the value $r_B(\theta)$ of field pattern (B). The respectively varying modulation contents of the left and right side lobes of field pattern (A) are, therefore, functions of the contour values of $r_C(\theta)$ because it is these varying vectors which determine a continuously varying degree of modulation of the side lobes of field pattern (A).

We obtain, therefore, two side lobes, the left one of which comprises $(+)$ equi-phased modulation components of 90 c.p.s. and 150 c.p.s. derived from the antenna pair $B_1$ upon which are superimposed the 90 and 150 c.p.s. modulation components from the sum of the outer antenna pairs, $C_{1+2+3}$, respectively, of $(+)$ and $(-)$ polarities for the 90 and 150 c.p.s. modulation, while in the right side lobe it is the 150 c.p.s. modulation radiated by the total antenna effect $C_{1+2+3}$ which is of a $(+)$ polarity and the 90 c.p.s. modulation which is of $(-)$ polarity. Since the radius vector, $r_B(\theta)$, is never zero and has an approximately constant value with $\theta$, and since the radius vector $r_C(\theta)$ in distinction therefrom rises from a zero value in the $\theta = 0$ direction to values which, with increasing angular deviations $\theta$ to both sides of the runway axis, $T-y$, exceed those of $r_B(\theta)$ it can be assumed that with respectively equal modulation factors of the $B_1$ and $C_{1+2+3}$ high frequency current transmissions, both, 90 and 150 c.p.s. modulations, respectively, in the right and left side lobes of field patterns (B) and (C) cancel each other at the points of intersection between curves (B) and (C) denoted with the respective angular deviations, $\pm \theta_1$, and that in the domain of $\theta$ greater than $\pm \theta_1$ the modulation information content is no longer of a mixture of 90 and 150 c.p.s. modulation components, but instead, a strictly 90 c.p.s. modulation on the left lobe side, and a 150 c.p.s modulation on the right lobe side.

Since the polar vector $r_C(\theta)$ reaches, with decreasing angular deviation $\theta$, an amplitude equal to that of the electrical noise level before it drops to zero on the runway axis, $T-y$, the left and right bi-zonal indications of the standard ILAS indicator become unreliable. This questionable zone, in so far as the accuracy of the indication and definition of the approach line is concerned, is better known as the "clearance zone" of the runway localizer path $T-y$. The width of this zone is determined by the slope of the tangents to the field pattern (C), in particular, in the vicinity of the runway axis $T-y$ and amounts to approximately, $\pm 2\frac{1}{2}$ degrees. This is a serious limitation since it is learned from past experience that the width as required for hooded instrument landings to a rolling stop (unassisted) should in no case be greater than ±½ to ±1 degree. The width of the clearance zone is to a considerable extent predetermined by the directional characteristic of the field pattern (C) and, in particular, by the slope of the tangent directions thereof at angular positions ±θ close to the runway localizer axis T–y; the reason why it is chosen to be ±2½°, is to prevent possible side lobe radiations (interference lobes) from reaching nearby obstructions and buildings, hence, to maintain as much of the bi-zontal field near the runway localizer course and, yet, to prevent too close a definition of the approach line then, the pilot, with no radio heading information available, must rely on the indications of separate instruments such as the directional gyro and the magnetic compass or magnetic earth inductor compass, which lack the essential accuracy for the turn-indicator sensitivity to precisely stay "on course." For this reason he reaches the outer fringes of the clearance zone where the electrical noise level exceeds by far the indicated positional error signal strength, more likely than not at an acute angle with respect to the transmitter location. This angle he can only correct subsequently after having visually noticed that he is already inside said clearance zone. By the time he is aware of this fact, however, he has already overshot the clearance zone. The predetermined design width of plus or minus 2½ degree for the said clearance zone in which the displacement information is no longer functioning, is therefore at best a compromise solution as a result of the lack of foolproof radio heading information between two limiting factors. This gives rise to the necessity of making it narrow enough to minimize the off course field lobe reflections from nearby buildings and other obstacles which would cause the runway localizer path to be irregularly defined, and the precaution which must be taken in the absence of a radio steering control with respect to a lower limit of the narrowness of the width of the clearance zone to prevent the well known "fish tailing" of the aircraft while coming in for an instrument landing.

The airborne modified receiver is shown by block diagram, FIG. 5. A standard non-directional antenna 50 is connected through a high frequency pre-amplifier 51, respectively, in series with transmission line to mixing circuit and detector circuit arrangement 52. Heterodyne signals are applied to the mixing circuit 52 over a connection 53 leading to a frequency doubler stage 54, supplied with high frequency oscillations from a voltage source 55 which may comprise a crystal oscillator and suitable frequency multipliers. The output of the mixer 52 is amplified by a plurality of I.F. amplifiers 61 and 62, and impressed upon the I.F. detector 63. Detector 63 is also connected to a bias-oscillator 65 which supplies AVC voltage over a lead 66 to I.F. amplifiers 61, 62 and R.F. amplifier 51. The speech signals developed in detector 63 are amplified by audio amplifier 67, which is connected to head phones 68.

The 90 c.p.s. and 150 c.p.s. signals contained in the I.F. carrier wave are fed over a lead 70 to a bi-zontal visual amplifier 71. The output signals of amplifier 71 are fed to a bi-zontal visual information channel consisting of two sub-channels comprising filter circuit 73, rectifier 75 and filter circuit 74 with rectifier 77. The 90 c.p.s. and 150 c.p.s. signal outputs of rectifiers 75 and 77 are connected to a center-tapped indicator moving coil similar to that used in the standard ILAS cross-pointer instrument, C.A.A. type 1–101–1, the center tap of which is grounded over a capacitor (not shown). The two coil halves thus formed by the center tap connection carry, respectively, rectified 90 and 150 c.p.s. pulsating D.C. currents causing the moving coil to deviate either to the Left or Right from its center position, depending upon which of the two D.C. current pulses is stronger.

A directional antenna array 81 suited for reception of very high frequency radiated energy, is mounted in a fixed position and held in place by the antenna mount 133 comprising a rotatable turret integral with the antenna structure 109. The turret 109 with a friction clutch locking mechanism (not shown) is operated together with a remotely controlled antenna structure turning mechanism consisting of the gear train 128, 129, 130, 131; a reversible type D.C. motor 94, and electrical connection leading therefrom to a Right and Left push button marked "R" and "L," as indicated on indicating instrument 124. The same gear, 128, is coupled to a synchro-generator 93 which, in turn, translates the rotational displacement of the antenna array 81 into corresponding currents driving the synchro-motor and reduction gear drive 142 (see FIG. 6), making them visible with needle pointer 115 of the indicator 124 when the push buttons "R" and "L" are operated. The needle deflections of pointer 115 are made visible on a graduated scale 117 with respect to the aircraft's longitudinal axis. A "veeder counter" is optionally provided which shows the distance of the aircraft from the transmitter in miles; its incorporation in the instrument 124 is especially recommended in case the ground transmitting system is that of the combined TACAN-DME system which uses distance measuring equipment as an integral part thereof (not shown). Antenna array 81 provides an input signal for the H.F. amplifier, phase and amplitude of which are functions of the incoming signal direction $\delta = \psi + 90°$, in which $\psi$ is the direction of the longitudinal axis of the aircraft (forward heading direction of the aircraft coinciding with the symmetry axis of the directional antenna 81) relative to the incident direction of the transmitter's radio wave. The high frequency pre-amplifier 82 is connected at its input to a balanced modulator circuit 83 to extract from the 90 and 150 c.p.s. modulated field pattern a new characteristic information, namely, the desired radio heading information independently of and unaffected by said 90 and 150 c.p.s. modulation of the transmitted wave. The balanced modulator circuit performs this duty by (1) suppressing, both the carrier and electrical noise components of the transmitted wave, and (2) by feeding a strong, locally produced oscillator voltage with a low frequency $v$ in conjugate fashion to two switching tubes connected in push-pull. Thus, if we denote the carrier frequency with $f$, the resulting output signal of the balanced modulator circuit consists only of the sideband signal frequency components having amplitudes that are a directional (cosine) function of the incident radio wave, $f(\delta)$, and having frequencies of $(f+v)$ and $(f-v)$. Because of the predominant amplitude of the low frequency modulation voltage of frequency $v$ over the magnitudes of the incoming carrier and electrical noise voltage (including the modulation voltages contained in the form of 90 and 150 c.p.s. sideband modulation products) all other sideband modulation components in comparison with the locally produced ones of frequencies $(f \pm v)$ may be neglected.

In this way the desired result to form a low frequency modulation content of $v$ c.p.s. with its amplitude and phase explicitly functions only of a radio heading direction with respect to the radio transmitter location, is obtained in a unique manner, first described fully in my U.S. Patent No. 1,868,945. It has the enormous advantage that irregular modulations with time of the transmitted carrier, such as a speech modulation, for instance of broadcast transmitter, cannot affect the steadiness of the derived bearing indications, such as was invariably the case with the earlier circuit arrangements for effecting a visual bearing indication. The use of these earlier circuits was, therefore, strictly confined to pure CW and tone modulated carrier transmissions.

It should be clear that the amplitude of this characteristic sideband frequency signal is related to the field-strength of the polar vectors which, in turn, are functions of the displacement of the aircraft from the pre-selected course only in this respect, that the turn-indicator sensitivity of the radio heading information varies without affecting the radio directional information itself. In this respect the sensitivity of the displacement information undergoes similar variations in strength without the character of the positional information being impaired in any way. The point in question which cannot be overemphasized in its importance is that the two informations are made to exist side by side with neither affecting the other.

This will become more clear from the following considerations: In the balanced modulator circuit the sideband output signals are mainly created by virtue of a linear detection or peak envelope detection method which is employed and necessitated because of the exceedingly strong local oscillator voltage input of frequency $v$. Without the introduction of an additional carrier this detection would result in a modulation envelope of twice the local modulator frequency $v$. But since the characteristic amplitude and phase information of the said sideband frequency output signals can only be of use if its phase and amplitude can be compared with the reference amplitude and phase of the constant low frequency oscillator voltage of frequency $v$, it is essential to add an additional carrier to said sideband frequency signal output. This additional carrier must in no way have any directional properties, the principal requirement being that its amplitude is constant and in phase with the said sideband frequency signal output. In this way the original modulation envelope of $v$ c.p.s. is recovered. Therefore, the sideband frequency signal output of the balanced modulator 83 is combined with a non-directionally received, modulated carrier signal derived from the output of pre-amplifier 81 which, now, makes possible the super-positioning and frequency conversion of the directional, locally produced modulation envelope of $v$ c.p.s. at an intermediate frequency. Since the modulation envelopes of 90 and 150 c.p.s. contained in pre-amplifier 81 are detected in the high frequency mixer circuit 52 also, the converted I.F. carrier wave as it appears in the first I.F. stage 61, contains not only said directional envelope of $v$ c.p.s. (radio heading information) but also the positional envelopes, respectively, of 90 and 150 c.p.s. These are functions of the angular deviation, $\theta$, of the aircraft's position from the runway axis, T–y.

A heterodyne oscillator signal fed from the oscillator 54 to the high frequency mixing and detector circuit 52 provides for a frequency conversion of the combined H.F. signal into a combined I.F. evaluation signal which is further amplified in the I.F. amplifiers 61 and 62. The evaluation signal comprises all the necessary information which we desire for our purposes, namely, an I.F. carrier signal of frequency $f_1$ c.p.s. containing (1) a directional modulation envelope of frequency $v$ c.p.s., the phase and amplitude of which are primarily a function of the heading, $\psi$, of the aircraft, and, (2) an angular deviation envelope the amplitude of which is a function of $\theta$, being either of 90 or 150 c.p.s. depending on which side of the runway axis T–y the aircraft is flying.

The said modulation envelopes characterizing the I.F. signal are extracted by the I.F. detector 63 and result in pulsating D.C. signals of low frequencies, respectively, of $v$ c.p.s. and 90 c.p.s. to one side of the runway, and, of $v$ c.p.s. and 150 c.p.s. to the other side of the runway. The dual low frequency signal combinations are due, respectively, to the side lobes of the field pattern (A) in FIG. 2, whereas the singular signal of frequency $v$ c.p.s. is derived without discrimination of the side lobes, from the entire field pattern (A) as a whole.

I.F. detector circuit 63 provides also an AVC voltage which may be fed to the H.F. amplifier 82 for controlling the gain thereof. The pulsating D.C. steering signal of $v$ c.p.s., and the pulsating D.C. bi-zonal signals of either 90 and/or 150 c.p.s. are further amplified in the respective visual amplifiers 86 and 71 and are led from there to the respective visual steering and bi-zonal channels in which the discrimination of the signals by means of the filters 73, 74 and 87 is achieved.

The pulsating D.C. steering signal, while being rejected by the filters 73, 74 is fed through the band pass filter 87, tuned to $v$ c.p.s., which in turn rejects the 90 and 150 c.p.s. pulsating D.C. bi-zonal signals, to the phase discriminator and rectifier 88. This circuit 88 is essentially a bridge circuit with a center arm comprising the one of two coil sections of the AFAI indicator (automatic flight approach indicator) movement 102, and side arms that are connected to the local modulation source 84. Thus the signal entering the said coil section 102 at the terminals 89, 90, as it changes phase by 180° when the aircraft's heading, $\psi$, passes through the direction of the incoming radio wave, to be sure, with respect to the constant reference phase of the currents flowing through said side arms, causes a needle swing, say, from left to right and, respectively, from right to left, in the foward and 180° backward heading direction $\psi$.

The other section of the split coil AFAI indicator movement 102 and the coil section of the bi-zonal indicator movement 140 in parallel therewith are connected to the output terminals 78, 79 of the two bi-zonal information sub-channels comprising the said filters 73 and 74 tuned to 90 and, respectively, 150 c.p.s. and rectifiers 75, 77.

The second indicator movement with needle pointer 140 incorporated in the AFAI instrument 124 provides a separate, independent indication of the bi-zonal information which is particularly useful, as we shall see, during cross wind conditions.

The pulsating D.C. steering signal responds exclusively to the high frequency amplitude $r_A(\theta)$ of field pattern (A) as though it were not modulated, mainly for the reason that the 90 and/or 150 c.p.s. modulation components are rejected in the filter 87 of the visual steering information channel.

The pulsating D.C. bi-zonal signal, on the other hand, responds exclusively to the contour of field vector $r_C(\theta)$ which, with the assumption of equal percentage modulations of the $B_1$ and $C_{1+2+3}$ antenna pair transmissions (FIG. 2), represents the variation of the 90 and 150 c.p.s. modulation present in the left and, respectively, right side lobe thereof. This holds strictly true only in the domain of angular deviations $\theta$ which lie outside of the region between the points of intersection of the two curves (B) and (C), i.e., outside of the values, $\pm\theta_1'$ shown in FIG. 2. Of particular importance is the ratio of the field vectors $r_A(\theta)$ and $r_C(\theta)$, since $r_C(\theta)/r_A(\theta)$ is greater than 1 outside said angular deviation $\pm\theta_1'$ and drops to zero inside the domain, $0° < (\theta) \angle \pm\theta_1'$. On the runway axis T–y, in other words, the steering information derived from the field vector $r_A(\theta)$ being that of $r_B(\theta)$, still persists, while the bi-zonal information derived from the field vector $r_C(\theta)$, respectively, in the $\theta=0$ direction of the T–y axis drops to zero.

The automatically executed approach path which results under different arbitrary initial conditions of initial positions and headings of the aircraft relative to the localizer path, T–x, consists, in general, always of the same flight maneuver whereby upon making either a right or left turn until the needle 102 reaches its zero position the aircraft's heading points at 90° from the connecting line to the transmitter T or at 270° from the said connecting line to the transmitter, depending upon which zone the aircraft is flying in. Without the pilot being aware whether he is in the one zone or the other, the gradual collapse of the bi-zonal position signal component as he enters the clearance zone approximately at right angles to the localizer path, T–x, forces him to "straighten out" either a left or right circular course so that invariably he winds up flying straight toward the transmitter T.

Approach paths thus executed by the pilot from the left and right zones are illustrated in FIG. 4. To make this more explicit we must start out with certain assumptions in regard to the polarity of the currents flowing, respectively, through the split steering coil section 103,$s$ and the bi-zonal position coil section 103,$p$ when, say, the airplane is flying "right" zone. Thus, in this zone we define that if in position P of FIG. 4 the airplane would be pivoted around P, from a $\psi=0°$ to a $\psi=+180°$ heading of the aircraft in a clockwise sense it would cause a left needle deflection component to increase from zero to a left maximum at $\psi=+90°$ and a decrease thereof from thereon until at $\psi=+180°$ it would be zero again. With this assumption the bi-zonal split position coil $103,p$ is connected up such, that at the point P, a left deflection component results which, at the $\psi=+90°$ matches that of the steering signal component. If the bi-zonal signal component would correspond with half of a full scale deflection to the left and the steering signal in the $\psi=+90°$ heading would produce also a half of a full scale deflection a total full scale left deflection will be obtained in the $\psi=+90°$ heading direction. Flying in direction $S_1$ and making a left turn, or flying in direction $S_2$ while making a right turn of the aircraft out of position P, obviously, has the same effect on the needle 102: the needle 102 will in either case swing from a maximum full scale left deflection into a position midway, i.e., between said maximum and the zero-center positions of the needle when the aircraft is headed either in the $\psi=0°$ or in the $\psi=+180°$ direction. Since the airplane is in motion and our aim is to turn the aircraft until the needle approaches zero we keep, of course, flying at the same rate of turn making an approximate circular turn around the transmitter T in the clockwise sense, both flight paths, $S_1$ and $S_2$ winding up in the $\psi=+270°$ heading direction relative to the transmitter T.

Since in all heading directions from $\psi=+180°$ to $\psi=+360°$ the transmitter T will be no longer to the left, but instead, to the right of the longitudinal axis of the airplane, the steering signal component will produce an opposite acting deflection component with respect to the deflection component produced by the bi-zonal position signal. Whereas pivoting the airplane around in the clockwise direction at point P of the airplane from $\psi=0°$ to $\psi=+180°$ had resulted in a left swing of the needle, turning the aircraft around its pivot P in the counter-clockwise sense from $\psi=0°$ to $\psi=180°$ causes a right swing of the needle which *opposes* the left deflection component of the bi-zonal position signal. The same holds true if we should turn the aircraft around its pivot P in the clockwise direction from $\psi=+270°$ to $\psi=+360°$ (or, $0°$), with the result that in pursuing flight paths such as $S_3$ and $S_4$ in FIG. 4, the resultant needle deflection will decrease from a half scale left deflection in both cases to a zero deflection and stay there if the heading of the aircraft is kept at a constant value of $\psi=+270°$. The only difference in the flight paths, $S_1$, $S_2$ and, respectively, $S_3$, $S_4$, is that in the latter case the amount of turn required is less than 90° in the former more than 90° until the needle reaches zero. Since the needle 102 cannot cross over its zero position, because the respective opposing steering and position signals in the said +270° heading direction are "balanced" by way of initial amplifier adjustments in the visual steering and visual bi-zonal position channels of the receiver, the pilot can only fly by an optimum needle indication which tends to move to the left of zero as soon as he moves his right or his left rudder control.

This condition changes, however, immediately upon entering the clearance zone where the left bi-zonal deflection component of the bi-zontal position signal begins to collapse with the result that the needle 102 wants to move to the right of zero rather rapidly. The pilot can only offset this motion by counteracting with a faster rate of turn of the aircraft to the *right* and again straightening out his turn into a straight path when the bi-zonal signal is no longer present. This takes place in the final arc of his flight, respectively, between $\psi=0°$ and +270°. As he assumes the $\psi=0°$ heading, the steering deflection component has become *also* zero so that, heading toward the transmitter T, *no currents* are flowing in either of the two split coil sections of the indicator movement.

Precisely the same considerations hold for the left zone positions of the aircraft. Regardless of what heading the airplane might be assuming at the time the equipment is turned on, the pilot in his procedure to obtain a zero deflection on the needle 102, will always wind up with a $\psi=+90°$ heading with respect to the transmitter T such as indicated by the shown position and heading Q in FIG. 4. Here the needle will in the case when the aircraft enters the clearance zone move to the left (with the assumed sense of polarity of the split steering coil section $103,s$) because the right bi-zontal deflection component collapses inside said clearance zone. This needle motion to the left can only be offset by counteracting with a faster rate of turn of the aircraft to the *left* and, again straightening out his left turn into a straight path when the bi-zonal signal is no longer present. This takes place in the final arc of his flight, respectively, between $\psi=+90°$ and $\psi=0°$. As he assumes the 0° heading, the steering signal deflection component has, again become zero so that, heading toward the transmitter T, again, no currents are flowing in either of the two split coil sections of the indicator movement. No matter in which zone the aircraft will be at the time the equipment is turned on the pilot, therefore, needs no information whether with respect to the direction of the transmitter T or the heading of his airplane. He will describe in any case a flight path "as though he would *see* the transmitting station" (or landing field). The instrument makes him perform a flight procedure which is very similar to that of a standard 600 feet landing under visible contact conditions.

The separate bi-zontal position indicator 140 will, of course, indicate directly in which zone the aircraft is flying, however, it should be emphasized that this information becomes only of importance if the pilot, once arrived on the localizer path T–x notices that the two needles 102 and 140 cannot be made to coincide to come on top of each other when presumably flying within the clearance zone in which he is supposed to be headed toward the transmitter. In that case the pilot is warned of a cross wind condition even if the control tower on the landing field should have omitted giving him a warning over the radio voice channel. Methods whereby the two needles may be brought into their respective zero positions under cross wind conditions will be described in greater detail later in this specification.

The automatic approach flight (AFAI) indicator 124 is shown in greater detail in FIG. 6, and FIG. 7. With reference to FIG. 6, the control push-buttons 122, marked "R" and "L", are seen accessible to the pilot for operating the loop drive motor 94 in FIG. 5, which in turn enables him to shift the directional antenna's symmetry axis away from normal during cross wind conditions. A veeder counter 118 is mechanically connected by a flexible cable and worm gear drive 145 to a DME distance measuring equipment preferably used in connection with VOR-DME and TACAN instrument approach and traffic control systems. Needle pointers 101, 102 and 140 are integral with the indicator movements 135, 134 and 144 which in turn contain the moving coil sections, respectively, $135,g$, $103,p$, $103,s$ and $136,p$. They indicate deviations, respectively, from the glide path, the AFAI zero control command function related to the flight plan, and the ground-supplied track information relative to the runway axis T–y.

Needle pointer 115 is an index marker to show the right or left crab angle of the aircraft during cross wind conditions; it is positioned over the crab angle scale 117, calibrated from −30° to +30° relative to the aircraft's longitudinal axis. The needle 115 is made integral with the gear reduction drive 142 and synchro-motor SM, while the scale 117 is made integral with a gear cam 123 which may be operated by the knurled knob 121 and gear train 126, 127. With reference to FIG. 7 which represents the elevational view of the AFAI instrument of FIG. 6, shows the three indicator movements 134, 135 and 144. Needle pointers 101, 102 and 140 have large radii so as to simulate as much as possible a plane parallel motion of the same across the face of the instrument dial.

The moving coil 103,p and s of the AFAI indicator is wound in two sections, 103,s, connected over the two leads, s, to the terminals 89, 90, and the section 103,p, connected over the leads, p, to terminals 78, 79. Both terminal pairs 78, 79 and 89, 90 connect, of course, to the corresponding terminal pairs shown in FIG. 5. The inner ends of the coil section 136,p of the separate bi-zonal indicator movement 144 are connected together and grounded, while the outer ends thereof are connected over the two leads, p', to the bi-zonal coil section 103,p of the AFAI indicator movement 134 in parallel, thus providing a ground connection for the coil section 103,p at the same time.

The synchromotor SM with reduction drive 142 is electrically connected over the leads marked "SM-G" to the synchro generator 93 in FIG. 5.

Electrical connections lead from the push-button controls 122 by way of an outlet socket and flexible cable 146 to the respective control terminals marked "DC-M" on the D.C. directional antenna drive motor unit 94 in FIG. 5.

The manner in which an optimum flight path is achieved will now be explained in greater detail.

Reference is had to FIG. 3, which shows the earlier discussed polar characteristics of the field patterns of the ILAS system, respectively, (B), the non-directional polar characteristic containing 90 and 150 c.p.s. modulations in equal amounts, and the speech modulation already referred to in connection with the explanation of FIG. 1; the polar vector designated $r_B(\theta_1)$ as a function of the direction $\theta_1$ with respect to the runway axis, T–y; the highly directional field pattern (C) with its polar vector, designated in the direction $\theta_1$ by $r_C(\theta_1)$ and being characterized as having only pure sideband frequency signal components of frequencies, $(f \pm 90)$, and $(f \pm 150)$ c.p.s., together with the resultant polar characteristic (A) with its polar vector $r_A(\theta_1)$ in the same direction $\theta_1$ relative to the runway axis, T–y.

Obviously, the locally produced radio heading envelope of the I.F. voltage in the first I.F. stage 61 of the receiver (FIG. 5) is therefore derived from the resultant polar characteristic (A) which, as can be seen, is of greater amplitude in all directions, $\theta$, than that of the directional sideband frequency signal pattern (C) which furnishes the positional displacement information in the form of 90 and 150 c.p.s. modulation envelopes for the said I.F. voltage in the receiver.

In order to bring the amplitudes of the latter modulation envelopes up to equal strength with the directional modulation amplitude of $v$ c.p.s. (since they are caused to act against each other in the maximum signal pick-up direction, $\delta_6 = +90°$, say, at point $P_c(x,y)_6$ in FIG. 3) in order to cancel each other in that direction, $\theta_c$, it is necessary to adjust the individual amplification factors in the respective preamplifiers and balanced modulator circuit, 82, 83 and, 51 accordingly. In this connection, it will be remembered from the explanations of FIG. 2, that the 90 and 150 c.p.s. modulation contents of the polar field pattern (A) to either side of the runway axis, T–y, varies as the angle $\theta$ of the aircraft's displacement changes in flight.

This varying modulation content, however, modifies the signal response in the coil section 103,p (FIG. 7) connected to terminals 78, 79 of the indicating instrument shown in FIG. 5, so that it will no longer be proportional to the contour of the polar field curve (A) in FIG. 3, but instead, proportional to the modified polar curve (C)', as shown in FIG. 3. In other words, at all points of the polar vector pattern (A) the rate of change of said signal response to the indicator will be more pronounced than the rate of change of the polar vector, $r_A(\theta)$ except in point $P_c(x,y)_6$ where they are equal.

If, with particular reference to FIG. 2, wherein the difference of amplitude variations of field vectors $r_B(\theta)$ and $r_C(\theta)$ within the angular domains, $0° < (\theta) < \theta_c°$, and, $0° < (\theta) < -\theta_c°$, is readily seen, we should assume equal modulation factors for the $B_1$ and $C_{1+2+3}$ antenna pair transmitting currents, cancellation of the 90 and 150 c.p.s. modulations in the right, and left lobes of field pattern (A) in FIG. 2 occurs already at the points of intersection, $\theta_1'$ of field pattern (C) with the contour of field pattern (B). These points are seen to lie extremely close to the fringes of the clearance zone of the runway axis, T–y. For all other angular deviations, $\theta_1° < (\theta) < -90°$, therefore, cancellation is complete so long as the field vector $r_C(\theta)$ is greater than the field vector, $r_B(\theta)$. In this case there will be a purely one-sided left or right torque effect, instead of a differential one, upon the coil movement 103,p, increasing in strength as $\theta$ reaches the value $\theta_c$ and falls of again in strength from thereon.

On the other hand, there exists a possibility to make, both, the 90 and 150 c.p.s. percentage modulations of the $B_1$, and, respectively, the $C_{1+2+3}$ antenna pair currents unequal.

The field amplitudes $r_B(\theta)$ of (B) are seen to be smaller than those of (C) as soon as the angle $\theta$ becomes greater than $\pm \theta_1$, even though the current distribution of the ILAS antenna array is such that their amplitudes taper off to both sides of the symmetry axis (in accordance with the binomial coefficients above referred to). It is therefore possible to effect a relative increase of the percentage modulation of the center antenna pair currents of $B_1$ by comparison with the percentage modulation of the antenna pair currents of $C_{1+2+3}$. Based on respectively equal modulation contents in the $\theta = \pm \theta_c$ angular deviations, new curves (B)' and (C)' may be computed and transposed as indicated in FIG. 3 in which the change from a mixed modulation of equal amplitudes of 90 and 150 c.p.s. on the runway axis T–y, to a singular 90 or 150 c.p.s. modulation content takes place more slowly until the crest values $r_A(\theta)$ coinciding with those of the new curve (C)' is reached in the $\theta = \pm \theta_c$ angular deviations. This does not mean that the rate of change of the high frequency field amplitudes $r_A(\theta)$ to be altered, nor that the amplitude and phase control 35 will have to be tampered with. The high frequency radiated energy remains concentrated along the runway axis T–y, same as before. But the contour of the curve (C)' whose rate of change forms the basis for the rate of change with $\theta$ of the bi-zonal indication is no longer that of the old curve (C) nor that of the field curve (A). Instead, it may be varied suitably in both domains of zonal deviations of $\theta$, $0° < (\theta) < \pm 90°$.

The bi-zonal indicator needle response thereupon by comparison with the radio steering response related to the variation of $r_A(\theta)$ with $\theta$ may therefore be regulated. As will be seen later in this specification, this is of great importance since slowing up the rate of change of the bi-zonal deflections of the indicator with $\theta$ automatically calls for a correspondance in the slowed up rate of turn of the airplane. There is thus gained a variable means with which to blend the curved approach path into the runway axis T–y more in harmony with the limitations of the human response of the pilot as he controls the heading by observing a zero control command function in the case where he operates high speed (possibly supersonic), high performance aircraft.

Such refinements are of little significance during the operation of the standard ILAS system since the ability for the pilot to steer the aircraft by means of an airborne directional antenna signal does not exist to begin with. Neither would the purely bi-zonal information (ILAS) signal permit the refinements made possible by this invention for flying a high speed, high performance aircraft within acceptable $\pm \frac{1}{2}°$ tolerances of the definition of the approach path for hodded instrument landings to a touch down.

If we designate the bi-zonal modulation signal at the mixing circuit 52 of FIG. 5 with $U_{01,mod,if}$, the amplification factor counting from the H.F. mixing circuit 52 to the input terminals 78, 79 of indicator 124 with $V_{01,v}$, and the bi-zonal, pulsating D.C. input signal to said indicator with $U_{01,mod,DC}$, the latter may be written as, (1) $\quad U_{01,mod,DC} = U_{01,mod,if} \cdot V_{01,v} = f(r_C(\theta))$ is therefore a function of the polar vector $r_C(\theta)$.

(8) $\quad U_{01,mod,DC} = U_{01,mod,if} \cdot V_{01,v} = f(r_C(\theta))$

It is thereby assumed from what was said in connection with a desirable slowing up of the rate of change of the contour of the curve $r_C(\theta)$, in so far as the modulation information content is concerned, that said curve will be represented by a new curve (C) which no longer corresponds with the radiated field pattern (C) in FIG. 3.

If we designate the radio steering modulation signal at the H.F. mixing circuit 52 (FIG. 5) $2U_{01,mod,if}$ i.e., if we make the directional modulation signal component in the maximum pick-up direction of the directional antenna 81 (FIG. 5) equal to the bi-zonal modulation signal component so that, in combination, the steering modulation signal in the $\psi = \pm 90°$ directions is twice as large as $U_{01,mod,if}$ and, furthermore, if we designate the amplification factor, counting from the H.F. mixing circuit 52 to the input terminals 89, 90, respectively, leading to the coil section 103,s of indicator 124 (FIG. 7) with, $V_{02,v}$, and the pulsating D.C. steering signal with $U_{02,steering,DC}$, then the latter may be written (2) $\quad U_{02,steering,DC} = 2 \cdot U_{01,mod,if} \cdot V_{02,v} \cdot M_{0v} \cdot$
$\cos(u \cdot t) \cdot \cos(\delta) = f(r_B + r_C(\theta))$ in which M is a constant modulation factor depending on the circuit parameters used in the balanced modulator circuit 83 (FIG. 5) and, in which $r_C(\theta)$ designated the original polar vector of the radiated field pattern (C), since the pulsating D.C. steering signal is immune to the modulation information content of the radiated field pattern (A) as expressed by its polar vector, $$r_A(\theta) = r_B + r_C(\theta)$$

Equation 2 is based on the equation of a periodically reversing *cardioid* receiving characteristic as a result of superpositioning pure sideband frequency signal components having in the maximum signal-pick-up directions, $\delta = 0°$ and $\delta = +180°$, of the directional antenna 81 magnitudes that are, respectively, equal to that of the (transmitter-modulated) carrier signal received from the non-directional antenna 50, the two signals being considered at the point of combination thereof, which is the H.F. mixing circuit 52 (FIG. 5). This (I.F.) combined signal is of the form:

(1a) $\quad U_{card,if} = U_{01,mod,if} \cdot (1+$
$M_{0v} \cdot \cos(u \cdot t + \theta_v) \cdot \cos(\delta))$ in which $u$ is the angular modulation frequency, $u = 2 \pi \nu$ (see also Equation 2) of the low frequency voltage source 84 with the voltage, $U_{0v} \cdot \cos(2 \pi \nu t)$. $\nu$ is the frequency of the modulation voltage source 84. Thus the combined (I.F.) radio steering signal prior to its detection in the second detector 63 (FIG. 5) is (in accordance with Equation 1a) found to be of the nature of a periodically reversing (with time) cardioid signal and it will be observed from Equation 1a that, for any given direction, $\delta$, of the incident radio wave relative to the directional antenna 81, say, $\delta < +90°$ (smaller than 90 degrees), alternate sum-and difference signals derived from the two antennae, respectively, $U_{01,mod,if}$ from the non-directional antenna network output 51 (FIG. 5) and $U_{02,sideband,if} \cdot \cos(\delta)$ from the directional antenna network output (balanced modulator 83, FIG. 5), will render during two consecutive half cycles of modulation of $\nu$ c.p.s. greater summation than difference signal amplitudes, while, for any direction, $\delta > +90°$ greater difference than summation signal amplitudes will result.

The coil section 103,s is by way of terminals 89, 90 connected to the center arm of a bridge circuit (not shown) contained in the phase discriminator 88, and the side arms of said bridge circuit connect to the local oscillator voltage source $U_{0v} \cdot \cos(u \cdot t)$, 84. Thus, the $\pm 180°$ phase changes of the IF steering signal when the symmetry axis of the directional antenna passes through the $+90°$ and $+270°$ directions of the angle, $\delta$, can be verified by a reversal of D.C. current flow in the center arm. It should be understood clearly, however, that in so far as the instantaneous reversals at the rate of $\nu$ c.p.s. of the directional antenna signal component relative to the non-directional antenna signal component are concerned, said reversals manifesting themselves in the center arm, take place in synchronism with the phase reversals caused by the modulation voltage source $U_{0v}$ in the side arms of the bridge circuit in 88. The pulsating instantaneous torques received by the coil movement 103,s act therefore in the same sense of direction during consecutive half cycles of modulation. To the right of the symmetry axis referred to, the consecutive impulses become increasingly of like intensity as the angle $\delta$ reaches the value of $0°$, in which event, in fact, they consist if impulses of equal strength at the peak of each half cycle of $U_{0v} \cdot \cos(u \cdot t)$. The needle will assume, of course, an effectively average deflection in a given direction off center. Identical considerations hold to the left of the symmetry axis referred to where impulses of the indicator needle during consecutive half cycles become progressively more alike in intensity, respectively in the opposite sense of direction as the value for $\delta = +180°$ is reached in which event an average total torque effect equal to twice that of a single D.C. impulse is again obtained.

We can express this by taking the difference of two consecutive cardioid signals, respectively, at the time $t$, and, $$t + \frac{\pi}{u}$$

given by Equation 1a, and find (assuming, $\varphi_v = 0$):

(1a)

$$U_{02,steering,DC} = U_{01,mod,if} \cdot \{1 + M_{0v} \cdot \cos(u \cdot t) \cdot \cos(\delta)\}$$
$$- U_{01,mod,if} \cdot \left\{1 + M_{0v} \cdot \cos\left[u \cdot \left(t + \frac{\pi}{u}\right)\right] \cdot \cos(\delta)\right\}$$

which, after the second detection in I.F. detector 63 (FIG. 5), renders the expression given by Equation 2.

It is desired to utilize and maintain a condition of balance between the bi-zonal and radio steering information signal inputs, respectively, of Equation 1 and Equation 2 that are simultaneously fed over terminal pairs, 78, 79 and 89, 90 to the coil sections 103,p and 103,s while the airplane is in motion. This is done (with certain given initial adjustments of amplification factors of the airborne equipment) by adjusting rudder and aileron controls of the airplane so as to keep the AFAI indicator needle 102 centered during the flight, instant for instant. There is encountered with a condition of balance, (3) $\quad U_{01,mod,if} \cdot V_{01,v}$
$+ 2 \cdot U_{02,steering,if} \cdot V_{02,v} \cdot M_{0v} \cdot \cos(\delta) = 0$ in which we disregard the instantaneous values, taking instead the effective amplitude values. Equation 3, in other words, is a zero control command function which must be brought into a relationship with the polar field patterns, (B) and (C).

Substituting for $U_{01,mod,lf} = V_{01} \cdot r_C(\theta)$, and for $$U_{02,steering,lf} = V_{02} \cdot r_B + r_C(\theta) \cdot \cos(\delta) \cdot M_{0v}$$

Equation 3 develops into:

(4) $\quad V_{01} \cdot V_{01,v} \cdot r_C(\theta)$
$\quad\quad + 2 \cdot V_{02} \cdot V_{02,v} \cdot \{r_B + r_C(\theta)\} \cdot M_{0v} \cdot \cos(\delta) = 0$ from which we can derive an expression for the included angle, $\psi$, between the radius vector, $r_A(\theta) = r_B + r_C(\theta)$ and the tangent, $dy/dx = y'$ to the field pattern (A), respectively, at the endpoint of the polar vector $r_A$. The FIG. 3 shows, that for (+) values of $\psi$ to the right of the transmitter T, the value of the angle, $\delta$, must be greater than $+90°$, so that $\cos(\delta) = \cos(\psi + 90) = -\sin(\psi)$, from which:

(5) $\quad \psi = \sin^{-1}\left[ -\frac{1}{2} \cdot \frac{V_{01,v}}{V_{02,v} \cdot M_{0v}} \cdot \left( \frac{r_C(\theta)}{r_B + r_B(\theta)} \right) \right]$ Needless to say, Equation 5 holds regardless of what type of transmitting patterns are used and may therefore be applied to the TACAN system as well, if we replace $r_C(\theta)$ and, $r_C(\theta) + r_B(\theta)$, with the respective response functions, respectively obtained at the input terminals of the type ID–249 right-0-left indicator of the TACAN, AN/ARN–21 receiver setup and at the input terminals 89, 90, say, of the present AFAI indicator 124 (FIG. 5) under otherwise identical transmitting conditions with the TACAN system.

Since $\psi$ is (+), this indicates that the polarity of connections 89, 90 relative to the polarity of connections 78, 79 must be chosen, such that the pulsating D.C. steering current flowing through the coil section 103,s and caused by a (+) heading $\psi$, will cause, say, a right deflection of the indicator needle 102 which must be counterbalanced by a left deflection caused by the pulsating D.C. bi-zonal current flowing through the coil section 103,p, respectively, in the left zone of the field pattern (A).

The (+) angle, $\psi$, obviously, may, for a particular angular deviation $\theta$ be chosen equal to $+90°$ and the thought lies near to choose the value, $\theta = \theta_c°$, as it pertains to the crest values, respectively, of both polar vectors, $r_C$ and $r_A$, and this for the reason that the derivatives equal to the expressions, $\dot{r}_C(\theta_c°)$ and $\dot{r}_A(\theta_c°)$, both, with respect to $\theta_c$ are equal to zero, since the tangents, $dy/dx$, are at a right angle to the angular deviation of $a_c°$.

Since the ratio, $$\frac{r_C(\theta)_c}{r_A(\theta)_c}$$

may readily be measured off, say, with a value, $K_c$ at the angular deviation $\theta = \theta_c$ from the field patterns (C) and (A), the amplification factors $V_{01,v}$, $V_{02,v}$ and the modulation factor of the local modulation of $\nu$ c.p.s. must be chosen such that:

(6) $\quad \dfrac{V_{01,v}}{2 \cdot V_{02,v} \cdot M_{0v}} = \dfrac{1}{K_c}$ in which event, $\sin(\psi) = \sin 90° = 1$.

Thus, with the factor $K_c$ determined we might off hand attempt the graphical integration of a flight curve by simply multiplying the measured off ratios, $r_C(\theta)/r_A(\theta)$ with $1/K_c$, starting from an arbitrary position $P(\theta,r)_0$ of the aircraft in space, draw the tangent $dy/dx = y'$ of the field pattern (A), (from which the steering information is derived) and plot the initial heading direction, $\psi_0$, relative to the value $\alpha_0 = \tan^{-1}(\dot{y}/\dot{x})$, in which, $\dot{y} = dy/dt$, and $\dot{x} = dx/dt$ would be interpreted as being the velocities of the airplane in the y and x directions.

The interdependence of the relationships between the angles $\psi_A = \alpha_A - \theta$, as related to the polar curve (A) and that between the angle, $\psi = \alpha - \theta$, as related to the motion of the airplane along a flight curve S requires a somewhat more precise analysis in the case of cross wind conditions.

In the first place the interdependence arises from the fact that in the same way as we arrive at an expression for a tangent value to a curve by a limiting process called differentiation between increments, $\Delta y$ and $\Delta x$ with respect to the rectangular coordinates $y$ and $x$ of the curve in question, we arrive at the concept of a velocity relative to the motion of a vehicle by an identical limiting process of differentiation of the motion of the vehicle with respect to time, respectively, along the x and y axis of a rectangular coordinate system. In the case where we deal with polar characteristics such as the field pattern (A) and (C), the expressions for the tangent $y' = dy/dx = \dot{y}/\dot{x}$ and the angle, $\psi$, are readily found in terms of the polar coordinates $\theta$ and $r_A$, simply by introducing a parameter $t$, and using the parametric equations, $x = x(t)$, $y = y(t)$, and giving the x, y coordinates in the form, $x = r_A \cdot \cos(\theta)$, and, $y = r_A \cdot \sin(\theta)$.

But for the independence to hold in either case, it is necessary that the airspeed of the airplane, $$V = dS/dt = V_g - W$$

is equal to the ground speed, $V_g$, whence W, the wind velocity, must be assumed as non-existing.

Only in this case can we draw an analogy between the rate of change of the airplane's motion (which is equal to the constant airspeed, $V = dS/dt = \sqrt{\dot{x}^2 + \dot{y}^2}$), and the tangent $dy/dx$ to the curve in question (including the angle, $\psi$, of Equation 11).

To illustrate this, reference is had to FIG. 8a, in which the airplane is assumed on the runway axis, moving in direction of ground speed $V_g$ toward the transmitter T. A wind velocity $+W$ is assumed, having the indicated direction with respect to the runway and a given assumed magnitude. If the airplane is to stay on the runway while in motion, obviously, its heading, $-\psi$, differs from $V_g$, being that of $\theta = 0$. Since ordinarily the heading, $-\psi$, coincides with the directional antenna's symmetry axis, a (+) directional steering signal component proportional to $2 \cdot \cos(\delta)$, in which, $\delta < +90°$, will be received, rendering, say, a right deflection of the AFAI indicator. On the other hand, a separate bi-zonal indicator, such as the indicator movement 144 in FIG. 6 and FIG. 7 would indicate a zero deflection (the aircraft being "on course").

In the case of FIG. 8b the conditions are the same, except that the direction of the wind velocity $-W$ is assumed reversed. The angle, $\delta$, is now greater than $+90°$, and accordingly, a negative directional steering signal proportional to $-2 \cdot \cos(\delta)$ would be produced, rendering a left deflection of the AFAI indicator.

In FIG. 9, we assume an entire flight plan, S, flown under cross wind conditions without the aid of a zero control command function derived from this invention. The curve S is seen to blend into the horizontal runway axis, of course, by changing the heading of the airplane in accordance with the cross wind, $-W$, which is assumed the same as that in FIG. 8b. From this flight curve (which may be flown under visible contact conditions) it is seen that the heading, $-\psi = \delta - 90°$, of the airplane at the position $P_1$ is negative, hence, $\delta$ is smaller than $+90°$ and a positive directional steering signal would be obtained counteracting, say, a negative bi-zonal position signal. But at position $P_2$ already it is seen that the heading, $\psi$, has become positive so that $\delta > +90°$, and, consequently, a negative directional signal can no longer counteract a bi-zonal position signal (since at $P_2$ we are still in the same zone). The same holds true for positions $P_3$ and $P_4$. The latter position is on the runway and the aircraft is headed into the wind.

Now, the Equation 11 clearly shows that in conformity with the polar characteristics with vectors, $r_C'(\theta)$ and $r_A(\theta)$ as shown in FIG. 3 (curve (C)' and (A)) the heading, $\psi$, must not change its sign if we assume that the $\psi=0°$ and $\psi=+180°$ directions correspond with the $\delta=+90°$ and $\delta=+270°$ directions (directional antenna's zero axis lined up with the aircraft's longitudinal axis). The said vectors are continuous functions having continuous derivatives and $\psi$ will obviously decrease from a value, $\psi<+180°$ to a value $\psi=+90°$, respectively, at the angular deviation $\theta_c$, and from there on further decrease until it attains the value 0. But at no time will $\psi$ become negative for the same reason that the angle $\delta$ will never be smaller than $+90°$.

Now, we shall, for the sake of illustration, try to fly a flight plan according to curve S' where we have shifted the directional antenna's zero axis, respectively, at the position $Q_3$ until the angle $\delta$ has become equal to $+90°$, to be sure with the airplane headed into the wind. With the applied correction, $\Delta\psi$, we shall now try to construct a flight curve the angle $\delta$ of which does no longer change its sign during the entire flight. After a few trials we shall find that, in fact, such a curve exists, only, it is shifted with respect to the former curve S (assumed under identical cross wind and air speed conditions).

To begin with, of course, we have established the "inner boundary" condition of the zero control command function by seeing to it that neither a bi-zonal position, nor a directional steering signal is possible at position $Q_3$ ($\theta=0$ and $\delta=+90°$). In following then the flight plan S' from position $Q_1$ toward the horizontal runway axis it is seen that at position $Q_1$ of the airplane the applied correction is mainly responsible that the angle $\delta$ remain smaller than $+90°$, remains smaller than $+90°$ at the position $Q_2$ although becoming progressively larger until at position $Q_3$ it attains the value of $+90°$ by which time the airplane has reached the runway. During the entire flight, therefore, from $Q_1$ to $Q_2$ to $Q_3$ the directional steering signal has been proportional to a positive cosine of $\delta$, causing progressively decreasing right deflections, while the aircraft remained continuously in the right zone for which presumably the bi-zonal position signal would cause a left deflection which would also be progressively decreasing.

It is thus possible to comply with the zero control command function to execute the automatically followed approach flight path with the AFAI indicator.

In general then, an automatically executed approach flight path with the AFAI indicator during cross wind conditions is a matter of a few trial and error corrections, preferably, far out and away from the transmitter, by repeatedly applying corrections $\Delta\psi$ of the directional antenna setting until a correspondence between the AFAI indicator 102 and the separate bi-zonal indicator 140 is obtained during the straight portion of the flight, respectively, "on course." In most practical cases the effect of cross wind is negligible.

Exclusively for the case in which cross wind effects may be considered negligible, a predication of the shape of the attained flight path by adhering to the zero control command function is now made on hand of the Equation 11, and this, irrespective of the angular deviation $\theta$ and the distance $r$ of the airplane in space. The integration of the flight path will in all cases terminate with a "forward" zero heading of $\psi$, respectively, in the $\theta=0$ direction of the runway axis T–y (see FIG. 3).

This follows from the fact that, with $r_C$ being equal to zero, no bi-zonal pulsating D.C. current flows through the coil section 103,$p$, and, if the AFAI indicator needle 102 must stay on zero, of course, no pulsating D.C. steering current must flow through the coil section 103,$s$. FIG. 3 shows one of the possible graphical integrations of the curved flight path $F(\theta)=S(\theta,r)$, starting with the computed heading, $\psi_0$, at the initial position $P(x_0,y_0)$ of the aircraft and being derived from the ratio, $r_{C_0}'(\theta)/r_A(\theta)_0$ substituted in Equation 11. $r_{C_0}'(\theta)$, in other words, is the polar vector of the modified curve (C)', and which is seen transformed into a shape differing from that of curve (C) because the modulation information content in the $\theta=\theta_c$ direction thereof is computed to be that of the transposed field curve (B)', respectively, at the crest value for $r_C(\theta)_c$, where the respective amplitudes of the 90 and 150 c.p.s. modulations of (B)' and (C)' are equal. In assuming a straight flight path between the positions marked 0 and 1, during the time interval $t_1-t_0$, we are permitting ourselves to make some small error since, actually, the heading $\psi$ is changed instant for instant. A polygon is therefore obtained at best instead of a smooth curve. As we pass from position 0 to 1, to 2, 3 a.s.f. up to point 14 a smooth curve would be obtained in reality, blending gradually into the runway axis T–y. The characteristic feature of the curve S is its arbitrary nature, then, had we selected any other initial position $P(x,y)$ for the airplane as a starting point, the integration would have led again to the required final $\psi=0$ heading, respectively, on the $\theta=0$ runway axis T–y.

I claim:
1. In an airplane guidance system having a transmitter for producing a radiated field having two zones which are disposed substantially symmetrically with respect to a runway, the fields in the two zones being modulated predominately at two different audio frequencies respectively; the combination comprising a non-directional antenna, a radio frequency mixer and detector circuit having its input connected to said non-directional antenna, a local oscillator circuit connected to said mixer and detector circuit, a directional antenna, a balanced modulator having two input circuits one of which is connected to said directional antenna, a second local oscillator connected to the other input circuit for supplying modulating oscillations to said balanced modulator, means for supplying the output of said balanced modulator to said mixer and detector circuit, a second detector circuit connected to the output of said mixer and detector circuit, a first amplifier connected to the output of said second detector circuit, a first output means connected to said amplifier for selecting and rectifying the modulating oscillations for producing a first direct current corresponding to the amplitude of the directionally received signals, a second amplifier connected to the output of said detector, a first filter connected to the output of said second amplifier for selecting one of said audio frequencies, a second filter connected to the output of said second amplifier for selecting the other of said audio frequencies, a rectifier connected to each filter, a second output means for producing a second direct current corresponding to the difference between the outputs of said rectifiers, an indicator connected to said first and second output means having a meter movement responsive to the difference between said first and second direct currents, a motor, means connected to the motor for causing it to rotate in either direction, means for connecting said motor to said directional antenna for positioning the same, said indicator including means responsive to the position of the motor for indicating the position of said directional antenna relative to the longitudinal axis of the airplane.

2. In an airplane guidance system having a transmitter for producing a radiated field having two major lobes which are disposed substantially symmetrically with respect to a runway, the fields in the two lobes being modulated predominately at two different audio frequencies respectively; the combination comprising non-directional antenna means, a radio frequency mixer and detector circuit having its input connected to said non-directional antenna means, directional antenna means, modulating means connected to said directional antenna means for impressing a third audio frequency modulation on the signals received by the directional antenna means, means for supplying the output of said modulating means to said mixer and detector circuit, a second detector circuit connected to the output of said mixer and detector circuit, a first output means connected to said second detector circuit for selecting and rectifying the oscillations of the third frequency for producing a first direct current corresponding to the amplitude of the directionally received signals, a filter connected to the output of said second detector circuit for selecting one of said two audio frequencies, a second filter connected to the output of said second detector circuit for selecting the other of said two audio frequencies, a second output means for producing a second direct current corresponding to the difference between the outputs of said filters, an indicator connected to said first and second output means having a meter movement responsive to the difference between said first and second direct currents.

References Cited in the file of this patent

UNITED STATES PATENTS

| | | |
|---|---|---|
| 1,958,258 | Alexanderson | May 8, 1934 |
| 2,213,273 | Earp | Sept. 3, 1940 |
| 2,422,073 | Bond | June 10, 1947 |
| 2,449,859 | Penfold | Sept. 21, 1948 |
| 2,489,270 | Cole | Nov. 29, 1949 |
| 2,539,482 | Rothschild | Jan. 30, 1951 |

FOREIGN PATENTS

| | | |
|---|---|---|
| 516,567 | Great Britain | Jan. 5, 1940 |

UNITED STATES PATENT OFFICE
CERTIFICATION OF CORRECTION

Patent No. 3,007,162                                                   October 31, 1961

Geoffrey Gottlieb Kruesi

It is hereby certified that error appears in the above numbered patent requiring correction and that the said Letters Patent should read as corrected below.

Column 8, lines 45 and 46, for "greater" read -- smaller --; column 13, line 16, strike out "(8)    $U_{o1,mod,DC} = U_{o1,mod,if} V_{o1}$, $v = F(r_c(\theta))$"; line 62, for that portion of the equation reading "$(u.t + \theta_v)$" read -- $(u.t + \varphi_v)$ --; column 15, line 5, the equation should appear as shown below instead of as in the patent:

$$U_{02, \text{ steering, if}} = V_{02}.\{r_B + r_C (\theta)\}.\cos (\delta) .M_{OV}.$$

column 16, lines 31 and 73, and column 17, lines 59 and 73, for "11", each occurrence, read -- 5 --.

Signed and sealed this 12th day of June 1962.

(SEAL)
Attest:

ERNEST W. SWIDER                                              DAVID L. LADD
Attesting Officer                                               Commissioner of Patents